United States Patent
You et al.

(10) Patent No.: US 9,576,367 B2
(45) Date of Patent: Feb. 21, 2017

(54) OBJECT DETECTION METHOD AND DEVICE

(71) Applicants: Ganmei You, Beijing (CN); Yuan Liu, Beijing (CN); Zhongchao Shi, Beijing (CN); Yaojie Lu, Beijing (CN); Gang Wang, Beijing (CN)

(72) Inventors: Ganmei You, Beijing (CN); Yuan Liu, Beijing (CN); Zhongchao Shi, Beijing (CN); Yaojie Lu, Beijing (CN); Gang Wang, Beijing (CN)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/797,667

(22) Filed: Jul. 13, 2015

(65) Prior Publication Data
US 2016/0019683 A1    Jan. 21, 2016

(30) Foreign Application Priority Data

Jul. 17, 2014   (CN) .......................... 2014 1 0341591

(51) Int. Cl.
*G06K 9/00* (2006.01)
*G06T 7/00* (2006.01)

(52) U.S. Cl.
CPC ... *G06T 7/0044* (2013.01); *G06T 2207/10021* (2013.01); *G06T 2207/10024* (2013.01); *G06T 2207/10028* (2013.01); *G06T 2207/30261* (2013.01)

(58) Field of Classification Search
CPC .................... G06T 2207/30261; G06T 7/0044
See application file for complete search history.

(56) References Cited

U.S. PATENT DOCUMENTS

| 8,254,643 | B2 | 8/2012 | Shi et al. | |
|---|---|---|---|---|
| 8,363,909 | B2 | 1/2013 | Guan et al. | |
| 8,660,317 | B2 | 2/2014 | Li et al. | |
| 8,666,146 | B1 * | 3/2014 | Smolic | G06T 3/0093 348/42 |
| 8,861,791 | B2 | 10/2014 | You et al. | |
| 2006/0193509 | A1 * | 8/2006 | Criminisi | G06K 9/00241 382/154 |
| 2011/0255741 | A1 * | 10/2011 | Jung | G06K 9/00369 382/103 |
| 2014/0379257 | A1 | 12/2014 | You et al. | |
| 2015/0243043 | A1 * | 8/2015 | Guan | G06T 7/20 701/1 |

FOREIGN PATENT DOCUMENTS

CN          103473757          12/2013

* cited by examiner

*Primary Examiner* — Oneal R Mistry
(74) *Attorney, Agent, or Firm* — Harness, Dickey & Pierce, PLC

(57) ABSTRACT

Disclosed is an object detection method used to detect an object in an image pair corresponding to a current frame. The image pair includes an original image of the current frame and a disparity map of the same current frame. The original image of the current frame includes at least one of a grayscale image and a color image of the current frame. The object detection method comprises steps of obtaining a first detection object detected in the disparity map of the current frame; acquiring an original detection object detected in the original image of the current frame; correcting, based on the original detection object, the first detection object so as to obtain a second detection object; and outputting the second detection object.

13 Claims, 11 Drawing Sheets

FIG.1A
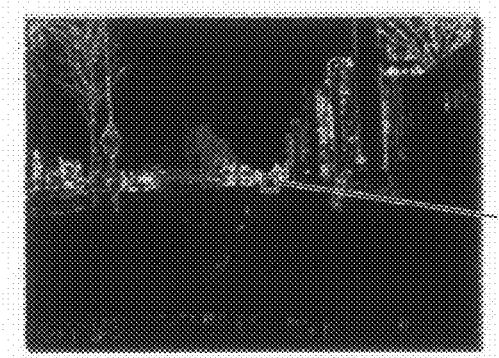
N-TH FRAME RELATED DISPARITY MAP
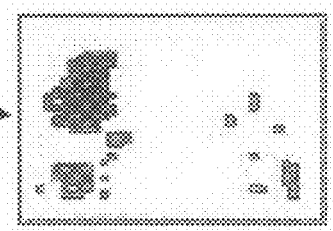
LOCALLY ENLARGED IMAGE
FIG.1B
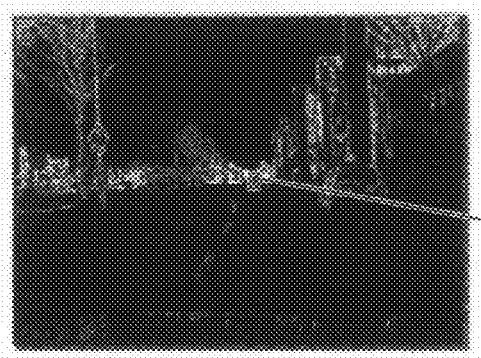
(N+1)-TH FRAME RELATED DISPARITY MAP
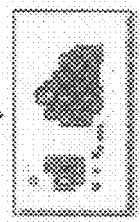
LOCALLY ENLARGED IMAGE
FIG.1C
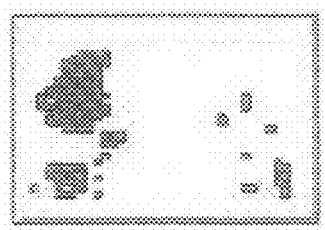 + 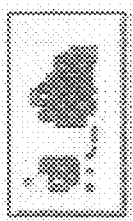 = 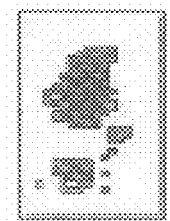

FIG.2A
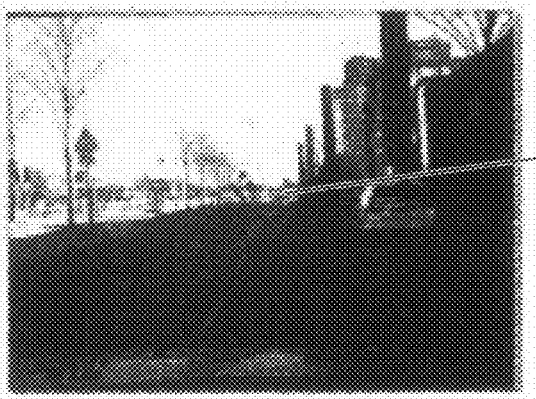
N-TH FRAME RELATED GRAYSCALE IMAGE
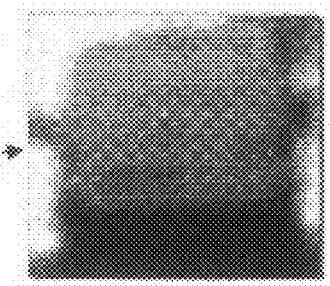
LOCALLY ENLARGED IMAGE
FIG.2B
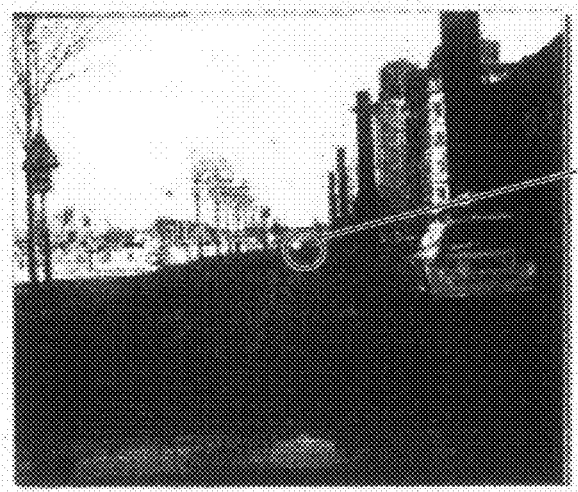
(N+1)-TH FRAME RELATED GRAYSCALE IMAGE
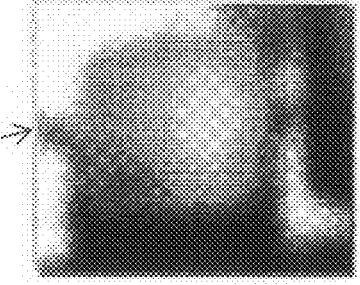
LOCALLY ENLARGED IMAGE FIG.10
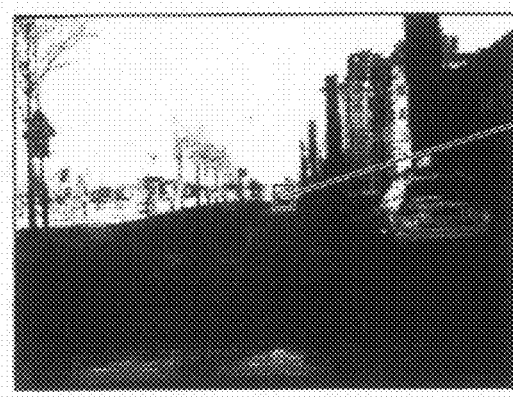
FIG.11
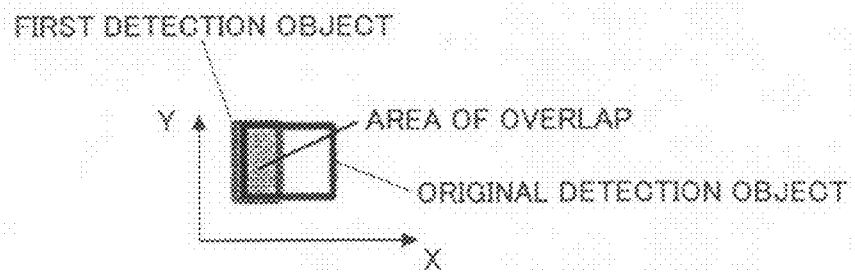
FIG.12
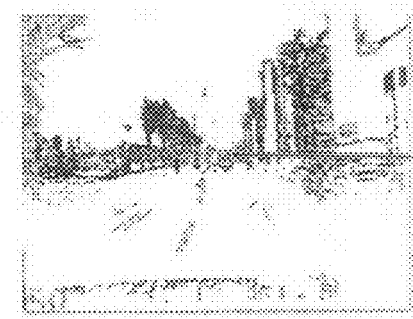
N-TH FRAME RELATED
DISPARITY MAP
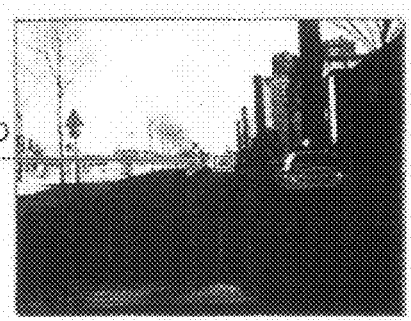
N-TH RELATED
GRAYSCALE IMAGE

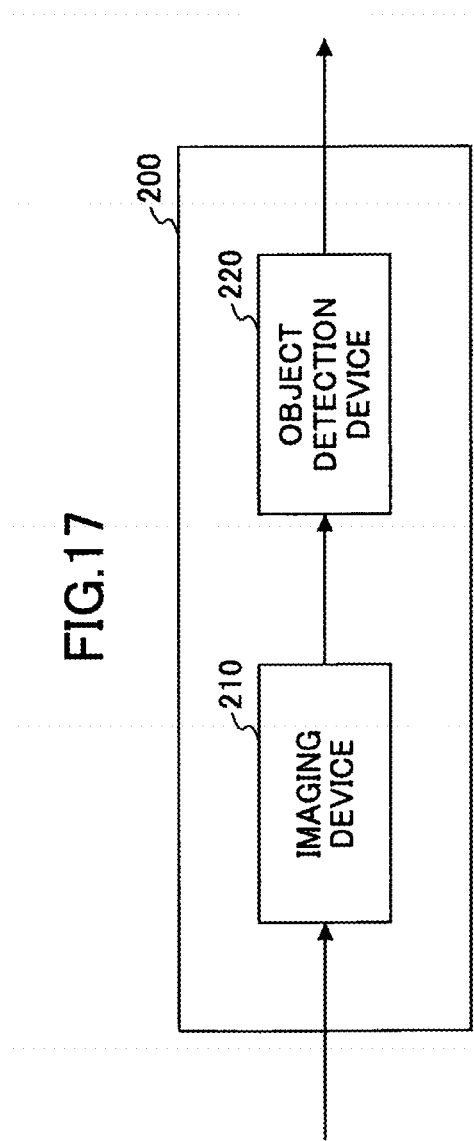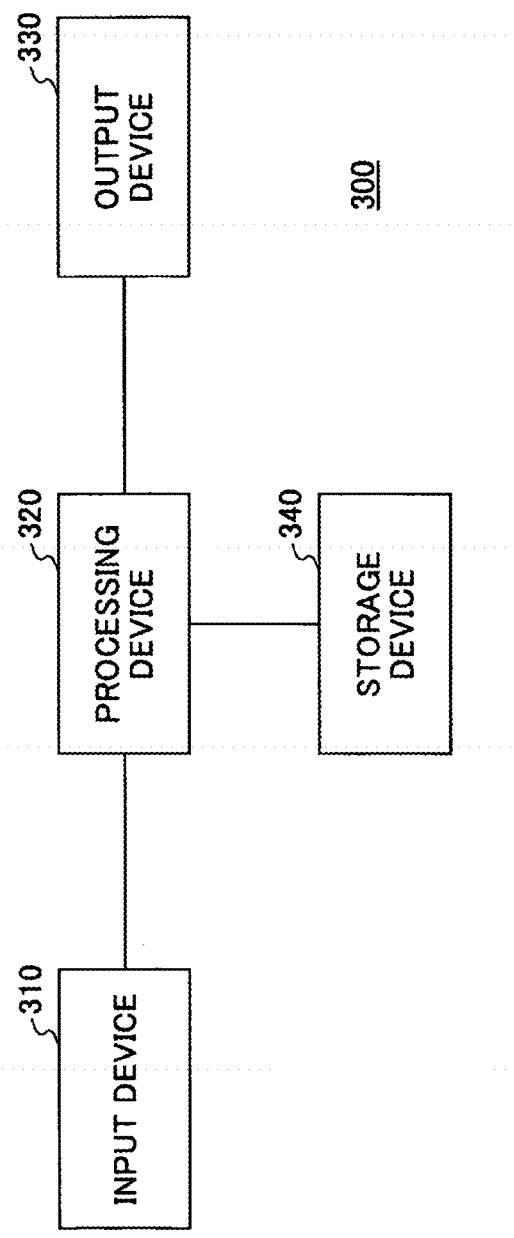

OBJECT DETECTION METHOD AND DEVICE

BACKGROUND OF THE INVENTION

1. Field of the Invention

The present invention relates to the field of digital image processing, and particularly relates to an object detection method and an objection detection device.

2. Description of the Related Art

An object detection method has been widely used up to now. In particular, in the field of computer vision, the detection and tracking of an object has become a hot research topic. The reason is that it may automatically sense the key information provided by a specific object for a computer, and may provide a bottom-layer service to some upper-lay applications (e.g., recognizing the activity of an object and understanding the relevant scenario). For example, a method of detecting a vehicle on a road in a driver assistance system may effectively detect or recognize the existence or non-existence, the distance, the velocity, and the orientation of the vehicle, so as to be able to assist a driver to avoid a traffic accident.

At present, there are mainly two kinds of object detection methods.

On the one hand, there is a kind of object detection method of detecting an object on the basis of a disparity map (or called a "depth map"). For example, it may detect, on the basis of the disparity map, a pedestrian, a vehicle, a fence, etc. Since the object detection method on the basis of the disparity map is not easily influenced by an environmental factor such as lighting, it is very robust to the change of environment. In addition, this kind of object detection method is also called a "disparity map based object detection method".

However, sometimes due to the performance restriction of a camera or the characteristic of a corresponding scenario, the camera may only obtain a disparity map in which the disparities are relatively sparse. Hereinafter this kind of disparity may is also called a "sparse disparity map". Here it should be noted that a sparse disparity map refers to one in which there are only a few pixel points having valid disparities (hereinafter, a pixel point having a valid disparity is also called a "disparity point") discontinuously existing on the boundary of an object. The reason of the occurrence of this kind of phenomenon may be that some stereo matching algorithms only match strong texture based pixel points or only adopt high confidence degree based pixel points. As a result, this kind of sparse disparity map may result in difficulty detecting or incompletely detecting an object such as a pedestrian or a vehicle.

On the other hand, there is a kind of object detection method of detecting an object on the basis of an original image (e.g., a grayscale or a color image). For example, it may utilize abundant grayscale or color information to detect various objects. In addition, this kind of object detection method is also called an "original image based object detection method".

However, in this kind of object detection method, the grayscale or color feature may be easily influenced by an environmental factor such as lighting. As a result, the visual feature of a same object may change in different frames (i.e., images), thereby resulting in not being able to match the objects, eventually resulting in the object missing detection.

SUMMARY OF THE INVENTION

According to a first aspect of the present invention, an object detection method is provided which is used to detect an object in an image pair corresponding to a current frame. The image pair includes an original image of the current frame and a disparity map of the current frame. The original image includes at least one of a grayscale image and a color image of the current frame. The object detection method comprises:

an obtainment step of obtaining a first disparity map based detection object (also called a "first detection object") detected in the disparity map of the current frame;

an acquisition step of acquiring an original image based detection object (also called an "original detection object") detected in the original image of the current frame;

a first correction step of correcting, based on the original detection object, the first detection object so as to obtain a second disparity map based detection object (also called a "second detection object"); and an output step of outputting the second detection object.

According to a second aspect of the present invention, an object detection device is provided which is used to detect an object in an image pair corresponding to a current frame. The image pair includes an original image of the current frame and a disparity map of the current frame. The original image includes at least one of a grayscale image and a color image of the current frame. The object detection device comprises:

an obtainment part configured to obtain a first detection object detected in the disparity map of the current frame;

an acquisition part configured to acquire an original detection object detected in the original image of the current frame;

a first correction part configured to correct, based on the original detection object, the first detection object so as to obtain a second detection object; and an output part configured to output the second detection object.

As a result, compared to the conventional techniques, by adopting the objection detection method and device according to the embodiments of the present invention, it is possible to utilize the interaction relationship between the disparity map based object detection method and the original image based object detection method, so as to accurately detect an object in the object detection process.

Particularly, in the embodiments of the present invention, it is possible to use the original detection object, which is detected by utilizing the original image based object detection method from the original image of the current frame, to correct the first detection object, which is detected by the disparity map based object detection method from the disparity map of the current frame, so as to obtain the second detection object, so that in the disparity map of the next frame, it is possible to use the corrected result (i.e., the second detection object) to serve as a historical detection object to continuously detect the first detection object, so as to be able to obtain a more accurate detection result.

In a similar way, in the embodiments of the present invention, it is also possible to use the first detection object, which is detected by the disparity map based object detection method from the disparity map of the current frame, to adjust the detection parameters adopted in the original image based object detection method, so that in the original image of the next frame, it is possible to use the adjusted results (i.e., the adjusted detection parameters) to serve as new detection parameters to continuously detect the original detection object, so as to be able to obtain a more accurate detection result.

Therefore, even in a case where a disparity map is a sparse one, by utilizing the embodiments of the present invention, it is possible not only to cause the original image based object detection to be more robust to the change of environment but also to cause the disparity map based object detection method to be more accurate.

BRIEF DESCRIPTION OF THE DRAWINGS

FIGS. 1A and 1B illustrate disparity maps obtained by a twin-lens camera from N-th and (N+1)-th frames, respectively;

FIG. 1C illustrates a compensation process in the disparity map based object detection method;

FIGS. 2A and 2B illustrate original images obtained by the twin-lens camera from the N-th and (N+1)-th frames, respectively;

FIG. 10 illustrates a current detection object detected by the original image based object detection method from an N-th frame;

FIG. 11 illustrates a matching process conducted with respect to a first detection object and an original detection object;

FIG. 12 illustrates the matched first detection object and original detection object after conducting the matching process shown in FIG. 11;

FIG. 17 is a block diagram of an object detection system according to an embodiment of the present invention;

FIG. 18 is a block diagram of a hardware system for conducting object detection, according to an embodiment of the present invention.

DETAILED DESCRIPTION OF THE PREFERRED EMBODIMENTS

Figure 3:
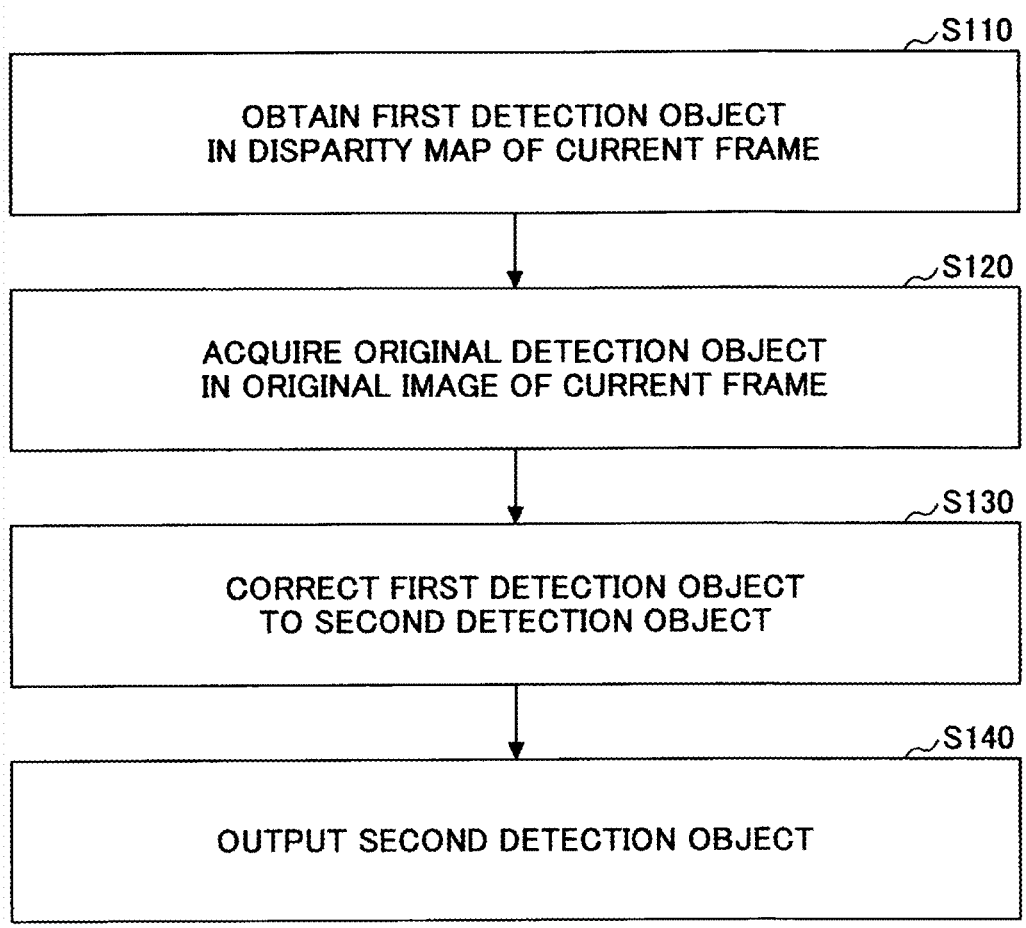
FIG. 3 is a flowchart of an object detection method according to an embodiment of the present invention.

In order to let those people skilled in the art better understand the present invention, hereinafter the present invention will be concretely described on the basis of the drawings and various embodiments according to the following order.

1. Brief Introduction of Conventional Techniques
2. Outline of Thought of Present Invention
3. Object Detection Method
4. Object Detection Device
5. Object Detection System
6. Hardware System for Conducting Object Detection 1. Brief Introduction of Conventional Techniques As described in Description of the Related Art, there are mainly two kinds of object detection methods in the conventional techniques, i.e., the disparity map base object detection method and the original image based object detection method.

In what follows, the disparity map based object detection method will be described by referring to FIGS. 1A, 1B, and 1C.

FIGS. 1A and 1B illustrate disparity maps obtained by a twin-lens camera from N-th and (N+1)-th frames, respectively.

FIG. 1C illustrates a compensation process in the disparity map based object detection method.

In general, a disparity map may be obtained by utilizing a stereo matching algorithm. The principle of the stereo matching algorithm is, by comparing the images of a same object captured by an image capture device (e.g., a stereo camera) under two different viewing angles (in a case of a twin-lens camera) or more different viewing angles (in a case of a multi-lens camera) and seeking their correspondence pixel points, calculating the positional deviation amounts between their correspondence pixel points, so as to obtain disparity information by which it is possible to generate a disparity map.

As shown in FIGS. 1A and 1B, in each of the disparity maps, there are two vehicles. One is located on the right side of the corresponding disparity map and near the twin-lens camera, and another is located in the middle of the corresponding disparity map and far away from the twin-lens camera.

Due to the performance restriction of the twin-lens camera, the characteristic of the corresponding scenario, the principle of the stereo matching algorithm, etc., each of the disparity maps shown in FIGS. 1A and 1B is just a sparse one including a few disparity points. In a case where this kind of sparse disparity map is used to detect an object thereof, since the disparity points related to the object are too sparse, the object cannot be detected, or can only be partially detected.

Here the vehicle far away from the twin-lens camera in each of FIGS. 1A and 1B is taken as an example of a waiting-for-detection object for describing the disparity map based object detection method.

It is assumed that it is possible to detect the waiting-for-detection object from the sparse disparity map of the N-th (N is a positive integer) frame by using the disparity map based object detection method, as shown by a rectangle in the image on the left side of FIG. 1A. The rectangle indicates that the waiting-for-detection object has been detected, and the size of the rectangle stands for the pixel based size of the waiting-for-detection object. Furthermore, as shown in the locally enlarged image on the right side of FIG. 1A, the region of the vehicle far away from the twin-lens camera (i.e., the waiting-for-detection object) has been relatively completely detected. However, since most of the sparse disparity points are located on the left side of the locally enlarged image, the result of the distance calculation related to the waiting-for-detection object may not be accurate. This may result in an error occurring in the moving velocity calculation related to the waiting-for-detection object, thereby resulting in estimating an incorrect region of interest (ROI) in the disparity map of the next frame, i.e., the (N+1)-th frame.

For this reason, when conducting object detection with respect to the (N+1)-th frame, by using the disparity map based detection method, it is only possible to detect a part of the waiting-for-detection object, as shown by a rectangle in the image on the left side of FIG. 1B. By comparing the images respectively located on the left sides of FIGS. 1A and 1B, it is apparent that the size of the waiting-for-detection object region detected from the (N+1)-th frame related disparity map is much less than that detected from the N-th frame related disparity map. Moreover, as shown in the locally enlarged image on the right side of FIG. 1B, only the left part of the vehicle far away from the twin-lens camera can be detected in the (N+1)-th frame related disparity; that is to say, the waiting-for-detection object cannot be completely detected.

In this case, although the compensation process based on a historical detection result is conducted in the disparity map based object detection method, for example, letting the weighted sum of the detection result related to the N-th frame and the detection result related to the (N+1)-th frame be a final detection result, the final detection result still cannot cover the whole waiting-for-detection object region, as shown in FIG. 1C.

As a result, by adopting this kind of disparity map based object detection method, in a case of a sparse disparity map, it is difficult to completely detect an object thereof such as a pedestrian or a vehicle.

In what follows, the original image based object detection method will be described by referring to FIGS. 2A and 2B.

FIGS. 2A and 2B illustrate original images obtained by the twin-lens camera from N-th and (N+1)-th frames, respectively.

In general, an original image may be a grayscale or color image directly captured by the twin-lens camera. Here it should be noted that on the basis of the different positions of the sensors in the twin-lens camera, right and left images may be captured, and any one of them may serve as the original image. Furthermore, in an example, the original image may also refer to an original image on the basis of which a disparity map may be generated.

For example, the original images shown in FIGS. 2A and 2B may be grayscale images corresponding to the disparity maps shown in FIGS. 1A and 1B. Here, for the sake of convenience, it is assumed that what each of FIGS. 2A and 2B shows is the left image captured by the twin-lens camera.

In addition, for the sake of convenience, the vehicle far away from the twin-lens camera in each of FIGS. 2A and 2B is also taken as an example of the waiting-for-detection object for describing the original image based object detection method.

Generally speaking, the original image based object detection method may be achieved by conducting an object template matching process. For example, it is assumed that there is an object template which is totally the same as the locally enlarged image on the right side of FIG. 2A. As a result, in a case of the N-th frame, since the region of the waiting-for-detection object in the relevant grayscale image totally matches the object template, it is possible to easily detect the whole region of the vehicle far away from the twin-lens camera by adopting the original image based object detection method, as shown by a rectangle in the image on the left side of FIG. 2A. Here the rectangle also indicates that the waiting-for-detection object has been detected in the relevant grayscale image, and the size of the rectangle also stands for the pixel based size of the waiting-for-detection object.

For this reason, when conducting object detection with respect to the (N+1)-th frame related grayscale image, the brightness of the right part of the vehicle far away from the twin-lens camera is dramatically increased due to the influence of an environmental factor such as lighting, as shown in the locally enlarged image on the right side of FIG. 2B. As a result, the grayscale feature of the waiting-for-detection object in the (N+1)-th frame related grayscale image dramatically changes due to the environmental factor, thereby resulting in mismatching the waiting-for-detection object and the object template, and finally resulting in the waiting-for-detection object missing in the (N+1)-th frame related grayscale image, as shown in the image on the left side of FIG. 2B.

Therefore, it is apparent that, by utilizing either the disparity map based object detection method or the original image based object detection method, it is impossible to obtain a satisfactory detection result.

2. Outline of Thought of Present Invention

In order to solve the problem in the conventional techniques, an object detection method and an object detection device are proposed according to the embodiments in the present invention. By utilizing them, it is possible to use the interaction relationship between the disparity map based object detection method and the original image based object detection method so as to accurately detect an object.

3. Objection Detection Method

In what follows, an object detection method according to an embodiment of the present invention will be described by referring to FIG. 3.

FIG. 3 is a flowchart of an object detection method according to an embodiment of the present invention.

The object detection method may be used to detect an object on the basis of an image pair corresponding to a current frame. The image pair includes an original image of the current frame and a disparity map of the current frame. The original image includes at least one of grayscale or color images of the current frame. As shown in FIG. 3, the object detection method includes STEPS S110 to S140.

In STEP S110 of FIG. 3, a first detection object detected from the disparity map of the current frame is obtained.

For example, STEP S110 may correspond to the disparity map based object detection method.

In an example, STEP S110 may include a step of obtaining a historical detection object from the disparity map of a historical frame; a step of estimating, on the basis of the historical detection object, a current estimation object corresponding to the historical detection object and in the disparity map of the current frame; a step of determining plural disparity map related candidate objects (also called "plural first candidate objects") in the disparity map of the current frame; a step of determining a matching degree between the current estimation object and each of the plural first candidate objects; and a step of determining a first candidate object, whose relevant matching degree is maximum, as the first detection object.

In an example, it is possible to estimate, on the basis of the position and size of the historical detection object, the position and size of the current estimation object corresponding to the historical detection object and in the disparity map of the current frame.

In an example, it is possible to determine, on the basis of the overlap area of each of the plural first candidate objects and the current estimation object on the horizontal plane, the matching degree between the two.

Particularly the step of determining the matching degree between the current estimation object and each of the plural first candidate objects may include a step of calculating the overlap area of the current estimation object and each of the plural first candidate objects on the horizontal plane. If the overlap area of one of the plural first candidate objects and the current estimation object on the horizontal plane is maximum, then this first candidate object may be determined as having a maximum matching degree, so that this first candidate object may be determined as the first detection object.

Here it should be noted that calculating the overlap area of the current estimation object and each of the plural first candidate objects on the horizontal plane means it is possible to only consider the width and depth of each object, i.e., it is not necessary to consider the height of each object.

Furthermore, in an example, only if the overlap area of one of the plural first candidate objects and the current estimation object on the horizontal plane is maximum, and is greater than or equal to a predetermined threshold, then this first candidate object may be determined as the first detection object.

If the overlap area of each of the plural first candidate objects and the current estimation object on the horizontal plane is less than the predetermined threshold, then it is possible to determine that no first candidate object, which matches the current estimation object, is found in the disparity map of the current frame, thereby being able to determine that the first detection object cannot be detected from the disparity map of the current frame.

Alternatively, if no first candidate object, which matches the current estimation object, is found in the disparity map of the current frame by using the above-described overlap areas, then it is possible to further calculate the distance between the current estimation object and each of the first candidate objects. If the distance between one of the first candidate objects and the current estimation object is minimum, and is less than or equal to a predetermined threshold, then this first candidate object may be determined as having a maximum matching degree, so that this first candidate object may be determined as the first detection object.

In addition, if there are, for example, two first candidate objects, the overlap areas between the two and the current estimation object on the horizontal plane being maximum, then the overlap areas between the two and the current estimation object on the depth plane are calculated. If the overlap area between one of the two and the current estimation object on the depth plane is maximum, then this one may be determined as having a maximum matching degree, so that this one may be determined as the first detection object.

Here it should be noted that calculating the overlap area between each of the first candidate objects and the current estimation object on the depth plane means it is possible to only consider the width and height of each object, i.e., it is not necessary to consider the depth of each object.

In STEP S120 of FIG. 3, an original detection object detected in the original image of the current frame is obtained.

For example, STEP S120 may corresponding to the original image based object detection method.

In an example, STEP S120 may be achieved on the basis of the prior information obtained in STEP S110, and may include, for example, a step of obtaining the original detection object detected within a predetermined range of the current estimation object in the original image of the current frame. Alternatively, STEP S120 may also be independently conducted with respect to the original image of the current frame in a case without the prior information.

In an example, STEP S120 may include a step of obtaining a historical object template and plural historical weight coefficients for the historical object template, the historical object template being divided into plural historical regions, the historical weight coefficients being respectively assigned to the plural historical regions; a step of determining, on the basis of the historical object template, plural original candidate objects (also called "plural original candidate objects") in the original image of the current frame; a step of calculating, on the basis of the plural historical regions and the historical weight coefficients, the weighted similarity between each of the plural original candidate objects and the historical object template; and a step of determining an original candidate object, whose relevant weighted similarity is maximum, as the original detection object.

In an example, the step of calculating, on the basis of the plural historical regions and the historical weight coefficients, the weighted similarity between each of the plural original candidate objects and the historical object template may include, regarding each of the plural original candidate objects, a step of dividing the corresponding original candidate object into plural original regions in the same way as the historical object is divided into the plural historical segments; a step of calculating the segment similarities between the plural original regions and the plural historical regions, respectively; a step of using the plural historical weight coefficients to weight the segment similarities; and a step of calculating the sum of the weighted segment similarities to serve as the weighted similarity between the corresponding original candidate object and the historical object template.

Additionally, in an example, only if the weighted similarity between an original candidate object and the historical object template is maximum, and is greater than or equal to a predetermined threshold, then this original candidate object may be determined as the original detection object.

In STEP S130 of FIG. 3, the first detection object is corrected on the basis of the original detection object so as to obtain a second detection object.

In an example, STEP S130 may include a step of determining, on the basis of the original detection object, a current correction region in the disparity map of the current frame; and a step of generating, on the basis of at least a set of disparity points included in the current correction region, the second detection object.

In an example, the set of disparity points included in the current correction region may only include a set of disparity points included in the current correction region, from which the distances to the first detection object are within a predetermined range.

In STEP S140 of FIG. 3, the second detection object is output.

In addition, after STEP S120, in an example, the objection detection method shown in FIG. 3 may further include an additional step of adjusting, on the basis of the first detection object, the plural historical weight coefficients so as to obtain plural current weight coefficients. Here it should be noted that the plural current weight coefficients will serve as plural historical weight coefficients with respect to the original image of the next frame.

In an example, the additional step may include a step of determining the disparity point distributions of the first detection object in the plural original regions obtained by dividing the original detection object, respectively; and a step of adjusting, on the basis of the disparity point distributions, the plural historical weight coefficients so as to generate the plural current weight coefficients for the plural original regions of the original detection object, respectively.

Particularly each of the plural current weight coefficients assigned to the corresponding original region is proportional to the number of the disparity points thereof. Alternatively each of the plural current weight coefficients assigned to the corresponding original region is proportional to the density of the disparity points thereof.

In addition, before the additional step and STEP S130, in an example, the object detection method shown in FIG. 3 may further include a step of determining whether the first detection object and the original detection object match each other.

In an example, the step of determining whether the first detection object and the original detection object match each other may include a step of determining whether the overlap area between the first detection object and the original detection object is greater than or equal to a predetermined threshold, and if so, then determining that the two match each other.

Alternatively, in an example, the step of determining whether the first detection object and the original detection object match each other may include a step of determining whether the distance between the first detection object and the original detection object is less than or equal to a predetermine threshold, and if so, then determining that the two match each other.

Thus it can be seen that by utilizing the object detection method according to this embodiment, it is possible to use the interaction relationship between the disparity map based object detection method and the original image based object detection method to accurately detect an object in the object detection process.

In particular, in this embodiment, it is possible to use the original detection object detected by the original image based object detection method from the original image of the current frame to conduct correction with respect to the first detection object detected by the disparity map based object detection method from the disparity map of the current frame, so that in the disparity map of the next frame, it is possible to use the corrected result (i.e., the second detection object) as a historical detection object to continuously detect the first detection object, so as to be able to obtain a more accurate detection result.

In a similar way, in this embodiment, it is also possible to use the first detection object, which is detected by the disparity map based object detection method from the disparity map of the current frame, to adjust the detection parameters (i.e., the weight coefficients) adopted in the original image based detection method, so that in the original image of the next frame, it is possible to use the adjusted results (i.e., the adjusted weight coefficients) as new detection parameters to continuously detect the original detection object, so as to be able to obtain a more accurate detection result.

Therefore, even in a case where a disparity map is a sparse one, by utilizing this embodiment, it is possible not only to cause the original image based object detection method to be more robust to the change of environment but also to cause the disparity map based object detection method to be more accurate.

In what follows, the object detection method shown in FIG. 3 will be described in detail by referring FIGS. 4 to 15.

As described above, the object detection method shown in FIG. 3 is used to utilize an original image of a current frame and a disparity map of the current frame so as to detect a waiting-for-detection object. In addition, for the sake of convenience, here it is assumed that the current frame is an N-th frame in an image sequence, and N is a positive integer.

In general, an original image may refer to one of the original images of a same object, captured by an image capture device (e.g., a stereo camera) under multiple angles of view. Here it is apparent that the multiple angles of view may include two or more angles of view; the original image may be formed by a sequence of pixel points located at different positions (i.e., having different coordinates); and the respective pixel points of the original image may have a same pixel value, or may have different pixel values. For example, the original image may be a grayscale image in which each pixel point is represented by a gray level (i.e., one component). Alternatively, the original image may be a color image in which each pixel point is represented by color values (e.g., RGB components).

In order to easily carry out the description, hereinafter a right or left grayscale image of a same object captured by a twin-lens camera is taken as an example of the original image, and a disparity map obtained on the basis of the right and left images is taken as an example of the disparity map corresponding to the original image. Here it should be noted that since how to obtain the disparity map on the basis of the right and left image is well-known to those people in the art, the relevant description is omitted.

Figure 4:
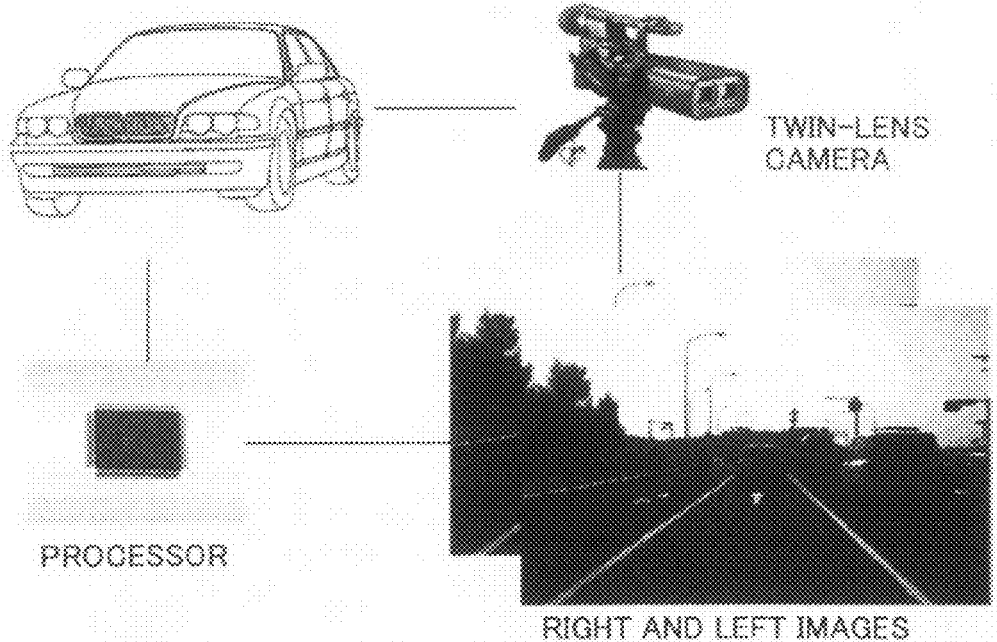
FIG. 4 illustrates an image capture system which may be applied to the embodiments of the present invention.

FIG. 4 illustrates an image capture system which may be applied to this embodiment.

In an example, it is possible to, by using a twin-lens camera mounted in a vehicle, obtain an original image and its corresponding disparity map. As shown in FIG. 4, a twin-lens camera mounted in a vehicle may capture right and left images while the vehicle is moving. After that, it is possible to use a designated or general-purpose processing unit (e.g., a processing chip) to generate a disparity map on the basis of the right and left images. In this way, it is possible to carry out this kind of image capture according to a predetermined time interval (e.g., in a case of 25 frames/second, the predetermined time interval may be ¹⁄₂₅ seconds) so as to generate a disparity map sequence, so that it is possible to utilize the generated disparity map sequence to conduct a process such as object detection or object tracking.

Figure 5:
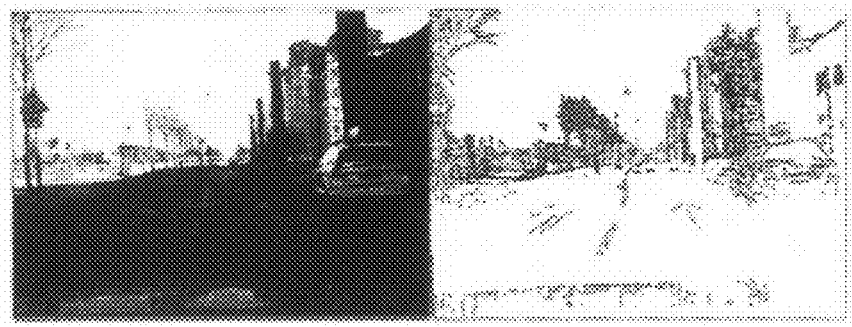
FIG. 5 illustrates an image pair corresponding to a same current frame, i.e., an N-th frame.

FIG. 5 illustrates an image pair corresponding to a current frame, i.e., an N-th frame in an image sequence.

As shown in FIG. 5, the image pair includes two images, i.e., first and second images from left to right. The first image is a grayscale image which is captured by a twin-lens camera, for example, the left image captured by the twin-lens camera. And the second image is a disparity map obtained on the basis of the right and left images captured by the twin-lens camera.

Alternatively, it is possible to remotely obtain the first and second images via a wired or wireless network from a twin-lens camera mounted in another vehicle.

Here it should be noted that the twin-lens camera may also be mounted in any other proper position. In addition, what FIG. 4 shows is just an example. That is to say, according to actual needs, the image capture system shown in FIG. 4 may further include a traffic monitor, a vision navigator, etc.

Figure 6:
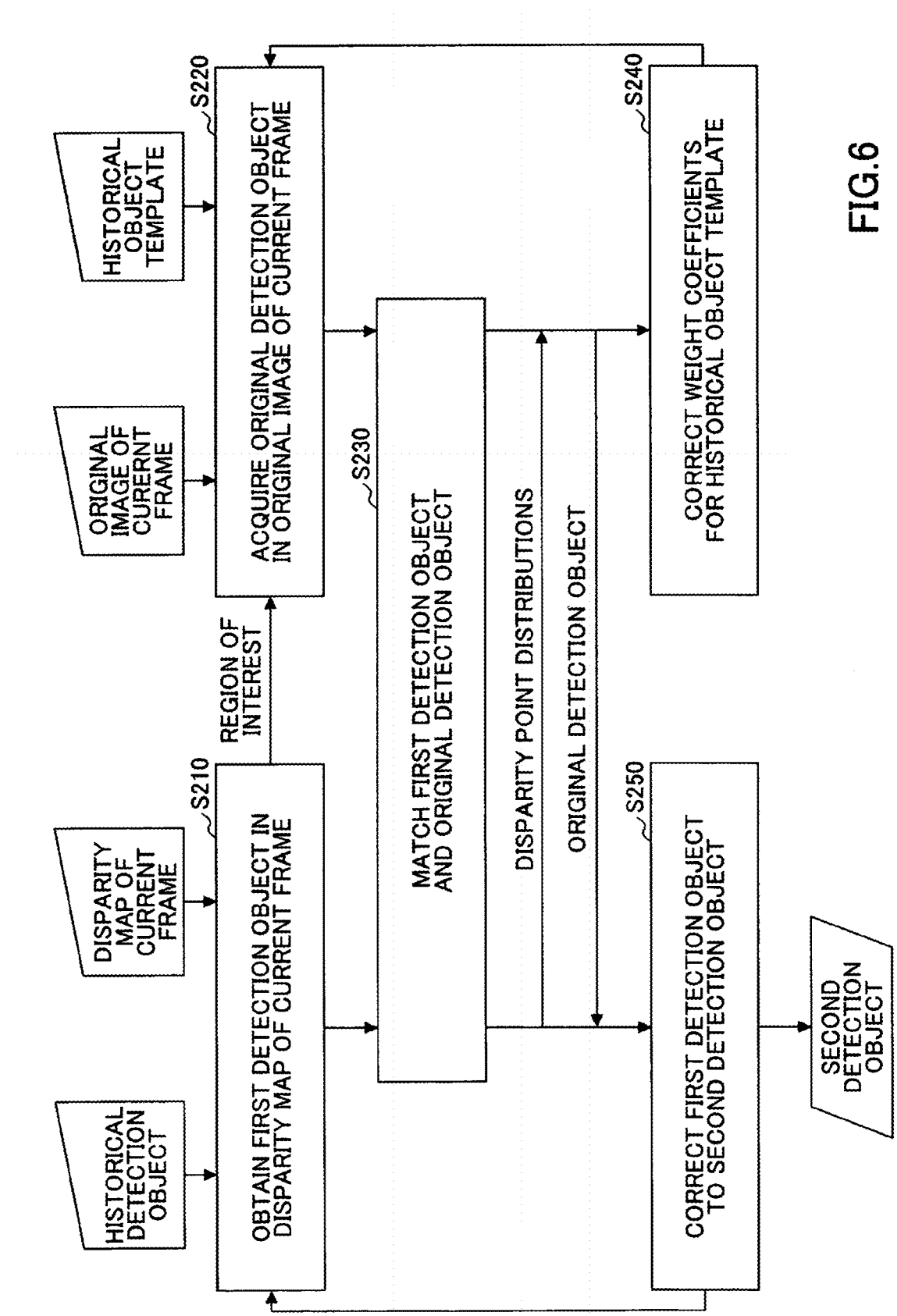
FIG. 6 is a flowchart in detail of the object detection method shown in FIG. 3.

FIG. 6 is a flowchart in detail of the object detection method shown in FIG. 3.

As shown in FIG. 6, in STEP S210, a first detection object is detected in the disparity map of a current frame, i.e., an N-th frame.

In an example, it is possible to adopt, for example, a U-disparity image based clustering algorithm to directly obtain the first detection object on the basis of the depth information in the disparity map of the current frame.

In an example, in order to reduce the amount of calculation, it is also possible to obtain a historical detection object from a disparity map of a historical frame; to predict an object region of interest (ROI) in the disparity map of the current frame on the basis of the historical detection object; and to conduct further object detection with respect to the object ROI so as to output the first detection object.

In particular, first, in a process of handling the disparity map of the historical frame (e.g., the disparity map of an (N−1)-th frame), it is possible to detect one or more historical detection objects in the disparity map of the historical frame, and to determine the position of each of the historical detection objects. For example, it is possible to determine the position of a historical detection object as the position of a disparity point in a disparity point set forming this historical detection object, for example, a central disparity point or boundary disparity point.

After that, in a process of handling the disparity map of the current frame (e.g., the disparity map of the N-th frame), it is possible to obtain the position of each of the historical detection objects; to convert the position of each of the historical detection objects into a relative position of the corresponding historical detection object with respect to the coordinates of a first predetermined reference point in the disparity map of the historical map; and to estimate, on the basis of the relative position as well as a predetermined moving direction and velocity of each of the historical detection objects, the estimation position of a current estimation object (i.e., the object ROI) corresponding to this historical detection object in the disparity map of the current frame.

In other words, if the moving direction and velocity of each historical detection object in the (N−1)-th frame have been determined, then it is possible to estimate, by utilizing the time interval $\Delta t$ between the (N−1)-th and N-th frames, the moving distances $\Delta X$, $\Delta Y$, and $\Delta Z$ along the X, Y, and Z directions of this object. Here it should be noted that regarding any one of $\Delta X$, $\Delta Y$, and $\Delta Z$, for example, $\Delta X$, if its value is positive, then that means the moving direction of the corresponding object is the positive direction of the X axis, and if its value is negative, then that means the moving direction of the corresponding object is the negative direction of the X axis. In addition, these kinds of moving direction and velocity may be determined in advance, or may be calculated or predicted by utilizing any proper approach. For example, it is possible to use the following equation (1) to calculate the estimation position of a current estimation object.

$$X_N = X_{N-1} + \Delta X = X_{N-1} + V_X \times \Delta t$$

$$Y_N = Y_{N-1} + \Delta Y = Y_{N-1} + V_Y \times \Delta t$$

$$Z_N = Z_{N-1} + \Delta Z = Z_{N-1} + V_Z \times \Delta t \quad (1)$$

Here $X_N$ refers to the X coordinate of the estimation position of the current estimation object in the N-th frame; $X_{N-1}$ refers to the X coordinate of the position of the historical detection object in the (N−1)-th frame; $\Delta X$ refers to the moving distance from the (N−1)-th frame to the N-th frame of the historical detection object along the X direction; $V_X$ refers to the moving velocity from the (N−1)-th frame to the N-th frame of the historical detection object along the X direction; $\Delta t$ refers to the time interval (i.e., a time slot) between the (N−1)-th and N-th frames; and so on.

After that, it is possible to use an approach such as a clustering approach to detect one or more first candidate objects in a disparity map of the current frame, and to obtain the positions of the first candidate objects. And then, the positions of the first candidate objects are converted into current relative positions with respect to the coordinates of a second reference point in the disparity map of the current frame, respectively. Finally, on the basis of the estimation positions of the current estimation objects and the current relative positions of the first candidate objects, it is possible to determine the matching degrees between the historical detection objects corresponding to the current estimation objects and the first candidate objects, respectively, and to determine a first candidate object, which has the maximum matching degree, as the first detection object.

Here it should be noted that the first reference point in the disparity map of the historical frame may be associated with the second reference point in the disparity map of the current frame, and the two may stands for a same physical meaning. For example, the first and second reference points may be, but are not limited to, the vanishing point of a road, the point of the sun, etc.

In addition, regarding an approach of conducting matching with respect to a historical detection object (also called a "historical tracking object") in the disparity map of the historical frame and a current estimation object in the disparity map of the current frame, it is also possible to see Chinese Patent Application No. 201210188661.2 whose entire contents are incorporated here by reference.

Of course, those people skilled in the art may also adopt any other proper approach to detect the current detection object in the disparity map of the current frame (i.e., the first detection object).

Figure 7:
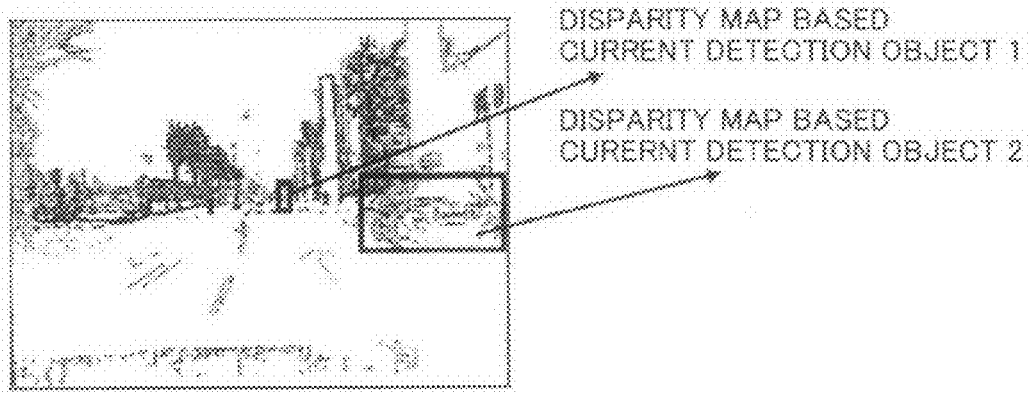
FIG. 7 illustrates current detection objects detected by the disparity map based object detection method.

FIG. 7 illustrates current detection objects detected by the disparity map based object detection method.

As shown in FIG. 7, two current detection objects, i.e., current detection objects 1 and 2, have been detected in the disparity map of a current frame.

Here, for the sake of convenience, the vehicle far away from the twin-lens camera (i.e., the current detection object 1) is also taken as an example of a waiting-for-detection object for describing the object detection method according to this embodiment.

In STEP S220 of FIG. 6, an original detection object detected in the original image of the current frame is obtained.

In an example, in order to avoid missing detection, it is possible to detect the original detection object from the whole region of the original image of the current frame. However, this may result in a relatively large amount of calculation.

Alternatively, in an example, in order to reduce the calculation amount, it is possible to first obtain the object ROI determined in STEP S210 of FIG. 6, and then to detect the original detection object from the object ROI in the original image of the current frame.

Here it should be noted that although the object ROI is determined in the disparity map of the current frame, since the disparity map of the current frame corresponds to the original image of the current frame, it is apparent that the two have the same coordinate system. In addition, although the original image of the current frame is the left image captured by the twin-lens camera, since the right image simultaneously captured by the twin-lens camera has a mapping relationship with the left image, it is also possible to achieve the object detection process in the right image on the basis of the object ROI.

In what follows, a weighted grayscale image based historical object template matching approach is used to detect the original detection object. However, the present invention is not limited to this; that it to say, any other proper approach may also be applied to this embodiment.

First, regarding the vehicle far from the twin-lens camera serving as the waiting-for-detection object, its historical object template is obtained.

For example, the historical object template may be an initial object template predetermined before detecting the original detection object. Alternatively, it is also possible to let the original detection object obtained from the (N−1)-th frame serve as the historical object template.

Next, in the object ROI of the original image of the current frame, it is possible to conduct, on the basis of the length and width of the historical object template, row-by-row or column-by-column scanning, so as to determine plural original candidate objects whose shapes and sizes are the same as the historical object template, and to determine the weighted similarity between each of the original candidate objects and the historical object template.

In order to determine the weighted similarity, it is necessary to divide the historical object template into plural historical segments.

For example, it is possible to divide the historical object template into M vertical segments, where M is a positive integer. Here since, in view of visual feature, the vertical segments of an object are relatively stable, it is possible to adopt the vertical segments. However, the present invention is not limited to this; that it to say, it is also possible to divide the historical object template into M horizontal segments, M×L rectangular segments (here L is a positive integer), etc.

And then, a weight coefficient w may be given to each of the M vertical segments. Here it is apparent that the sum of the weight coefficients is 1, i.e., $\Sigma_{1 \le i \le M} w_i = 1$. In addition, it is assumed that at the initial time, all the weight coefficients have a same value, i.e. $w_1 = w_2 = \ldots = w_M$. Here M is a positive integer.

After that, it is possible to divide, in the same way as the historical object template is divided, each of the original candidate objects into plural original segments, so as to let the divided original segments of this original candidate object uniquely correspond to the divided historical segments of the historical object template.

Figure 8A:
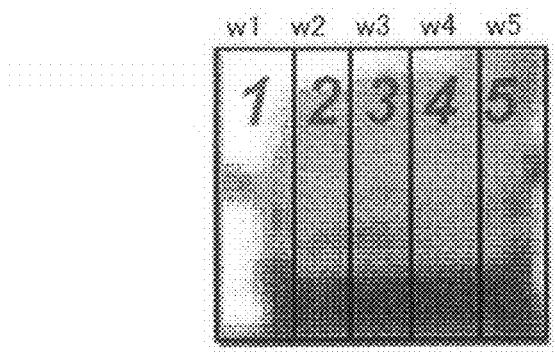
FIGS. 8A and 8B illustrate region division applied to a historical object template and an original image based candidate object, respectively.
Figure 8B:
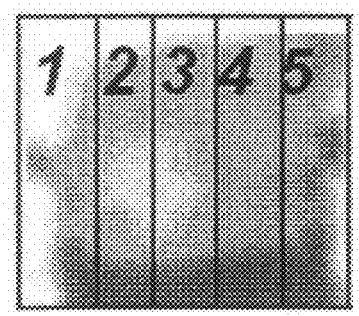

FIGS. 8A and 8B illustrate region division applied to a grayscale image based historical object template and an original candidate object R, respectively.

In FIG. 8A, the historical object template is vertically divided into five historical segments, and each of the five historical segments has its own weight coefficient. In the same way, in FIG. 8B, the original candidate object R is also vertically divided into five original segments.

And then, it is possible to obtain the weight coefficients for the historical object template calculated after the (N−1)-th frame. Here, for the sake of convenience, it is assumed that, after the (N−1)-th frame, the weight coefficient of each of the five historical segments of the historical object template is still equal to the initial weight coefficient, i.e., $w_1 = w_2 = w_3 = w_4 = w_5 = 1/5$.

After conducting the region division with respect to the historical object template and the original candidate object R as well as giving the weight coefficient to each of the divided original segments, it is possible to calculate the weighted similarity between the historical object template and the original candidate object R. For example, the following equation (2) may be adopted for calculating this kind of weighted similarity.

$$\text{Object Similarity}(\text{region}_R) = \Sigma_{1 \le i \le M}(w_i * S_i) \quad (2)$$

Here, S refers to the weighted similarity; $\text{region}_R$ refers to the region of the original candidate object R; $w_i$ refers to the weight coefficient of an i-th original segment; and $S_i$ refers to the segment similarity between the i-th historical segment and the i-th original segment.

In an example, $S_i$ may be calculated on the basis of the grayscale histograms of the i-th historical segments of the historical object template and the i-th original segment of the original candidate object R. Hereinafter, a first historical segments 1 of the historical object template and a first original segment 1 of the original candidate object R are taken as examples for description.

For example, it is possible to calculate the number of pixel points of each of gray levels [0,255] in the first historical segment 1 of the historical object template. This may be determined by utilizing the grayscale histogram of the first historical segment 1 of the historical object template.

Figure 9:
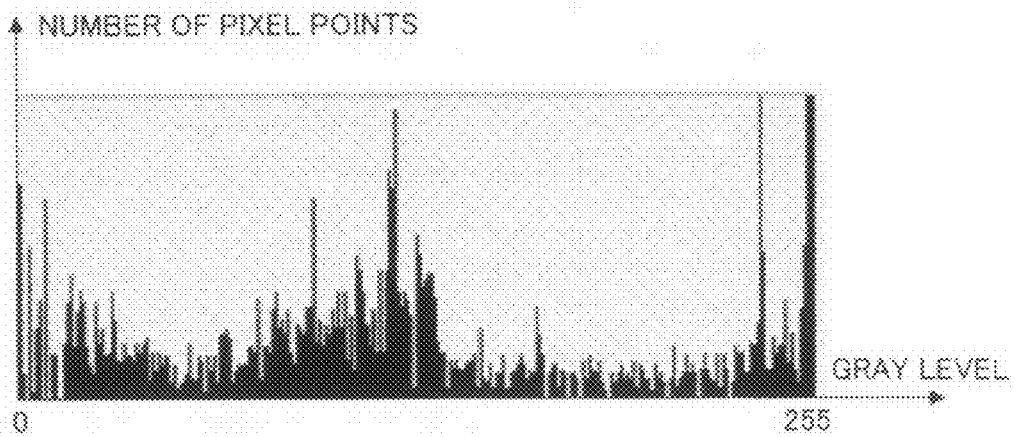
FIG. 9 illustrates a grayscale histogram of a grayscale image based historical object template segment.

FIG. 9 illustrates the grayscale histogram of the first historical segment 1 of the historical object template.

As shown in FIG. 9, the horizontal axis stands for the gray levels [0,255], and the vertical axis stands for the number of pixel points of each of the gray levels.

And then, in the same way as above, it is also possible to obtain the grayscale histogram of the first original segment 1 of the original candidate object R.

After that, by adopting the following equation (3), it is possible to calculate the segment similarity $S_1$ between the first historical segment 1 of the historical object template and the first historical segment 1 of the original candidate object R.

$$S_1 = 1 - (\Sigma_{0 \le j \le 255}((N\_block_j - N\_region_j) * (N\_block_j - N\_region_j) / (N\_block_j + N\_region_j))) \quad (3)$$

Here, $N\_block_j$ refers to the number of pixel points, whose gray levels are j, in the first historical segment 1 of the historical object template, and $N\_region_j$ refers to the number of pixel points, whose gray levels are j, in the first original segment of the original candidate object R.

In this way, it is possible to calculate the segment similarity $s_1$ between the first historical segment 1 of the historical object template and the first original segment 1 of the original candidate object R.

Additionally, in the same way as above, it is also possible to calculate the segment similarities $s_2$ to $s_5$ between the second to fifth historical segments of the historical object template and the second to fifth original segments of the original candidate object R, respectively.

After obtaining the segment similarities $s_1$ to $s_5$, finally, by using the equation (2) above, it is possible to calculate the weighted similarity of the historical object template and the original candidate object R.

Thus, in this way, it is possible to calculate the weighted similarity between the historical object template and each original candidate object.

After that, by comparing the weighted similarities between the historical object template and the original candidate objects, it is possible to find the maximum one thereof. And then, it is determined whether the maximum weighted similarity is greater than a predetermined threshold T1 which may be set according to, for example, an empirical value. In the former case, it may be determined that the original candidate object corresponding to the maximum weighted similarity is the current detection object (i.e., the original detection object). That is to say, at this time, the vehicle far away from the twin-lens camera is found in the original image of the N-th frame.

FIG. 10 illustrates the current detection object detected by the original image based object detection method on the basis of the original image of the N-th frame.

As shown in FIG. 10, the vehicle far away from the twin-lens camera has been detected from the original image of the N-th frame on the basis of the historical object template of this vehicle.

In STEP S230 of FIG. 6, a matching process is conducted with respect to the first detection object and the original detection object.

Before conducting a correction process on the basis of the first detection object and the original detection object, in an example, it is possible to first determine the matching degree of the two, so as to avoid an incorrect correction result due to using a first detection object and an original detection object not corresponding mutually. Of course, in order to reduce the calculation amount, or in a case where there is only one waiting-for-detection object, the matching process may also be omitted.

For example, it is possible to determine, on the basis of the overlap area of the first detection object and the original detection object, whether the two match each other.

For this purpose, it is possible to put, by utilizing direct mapping or coordinate conversion, the first detection object and the original detection object into a same coordinate system, and then, it is possible to calculate the overlap area ratio of the two. If the overlap area ratio is greater than a predetermined threshold T2, then it may be determined that the two well match each other. Similarly, the predetermined threshold T2 may be set according to, for example, an empirical value.

FIG. 11 illustrates a matching process conducted with respect to a first detection object $d_{obj}$ and an original detection object $g_{obj}$.

As shown in FIG. 11, there is an overlap area between the first detection object $d_{obj}$ and the original detection object $g_{obj}$ in the same coordinate system. In an example, the overlap area ratio Overlap Ratio($g_{obj}$, $d_{obj}$) of the two may be calculated according to the following equation (4).

$$\text{Overlap Ratio}(g_{obj}, d_{obj}) = \text{Overlap Area}(g_{obj}, d_{obj})/\min(Ag_{obj}, Ad_{obj}) \quad (4)$$

Here, Overlap Area($g_{obj}$, $d_{obj}$) refers to the overlap area of the first detection object $d_{obj}$ and the original detection object $g_{obj}$; and min($Ag_{obj}$, $Ad_{obj}$) refers to the minimum one of the area $Ag_{obj}$ of the original detection object $g_{obj}$ and the area $Ad_{obj}$ of the first detection object $d_{obj}$. Here it should be noted that the area of a region may be obtained by the pixel based height of the region multiplied by the pixel based weight of the region, and the overlap area of an overlap region may be calculated by the pixel based height of the overlap region multiplied by the pixel based weight of the overlap region.

If the calculated result, i.e., the calculated overlap area ratio is greater than the predetermined threshold T2, then it may be determined that the original detection object $g_{obj}$ is similar to the first detection object $d_{obj}$.

FIG. 12 illustrates the matched original detection object and first detection object.

As shown in FIG. 12, by utilizing the matching process shown in FIG. 11, it is possible to obtain the matched original detection object and first detection object of the waiting-for-detection object (i.e., the vehicle far away from the twin-lens camera) from the original image of the current frame and the disparity map of the current frame.

In STEP S240 of FIG. 6, the weight coefficients for the historical object template are adjusted on the basis of the first detection object.

Since the matched original detection object and first detection object have been obtained as described above, it is possible to consider that the two have a same position and size. As a result, it is possible to correct, on the basis of the first detection object, the weight coefficients for each original segment of the original detection object, so as to be able to be used for continuously detecting the original detection object in the original image of the next frame (i.e., a (N+1)-th frame).

In an example, it is possible to correct the weight coefficient $w_i$ for an original segment i of the original detection object in the original image of the current frame by utilizing the following equation (5), so as to obtain the corrected weight coefficient $w'_i$ for the original segment i of the original detection object in the original image of the current frame.

$$w'_i = (w_i + (n_i/\Sigma_{1 \le k \le M} n_k))/2 \quad (5)$$

Here, $n_i$ refers to the number of the disparity points of the first detection object in the original segment i of the original detection object in the original image of the current frame; $\Sigma_{1 \le k \le m} n_k$ refers to the total number of the disparity points of the first detection object in the original detection object region in the original image of the current frame; and k refers to an original segment of the original detection object in the original image of the current frame.

Thus, according the equation (5), it can be seen that the greater the number of the disparity points in an original segment of the original detection object in the original image of the current frame is, the higher the weight coefficient for this original segment is, i.e., the higher the confidence degree of this original segment is.

Figure 13:
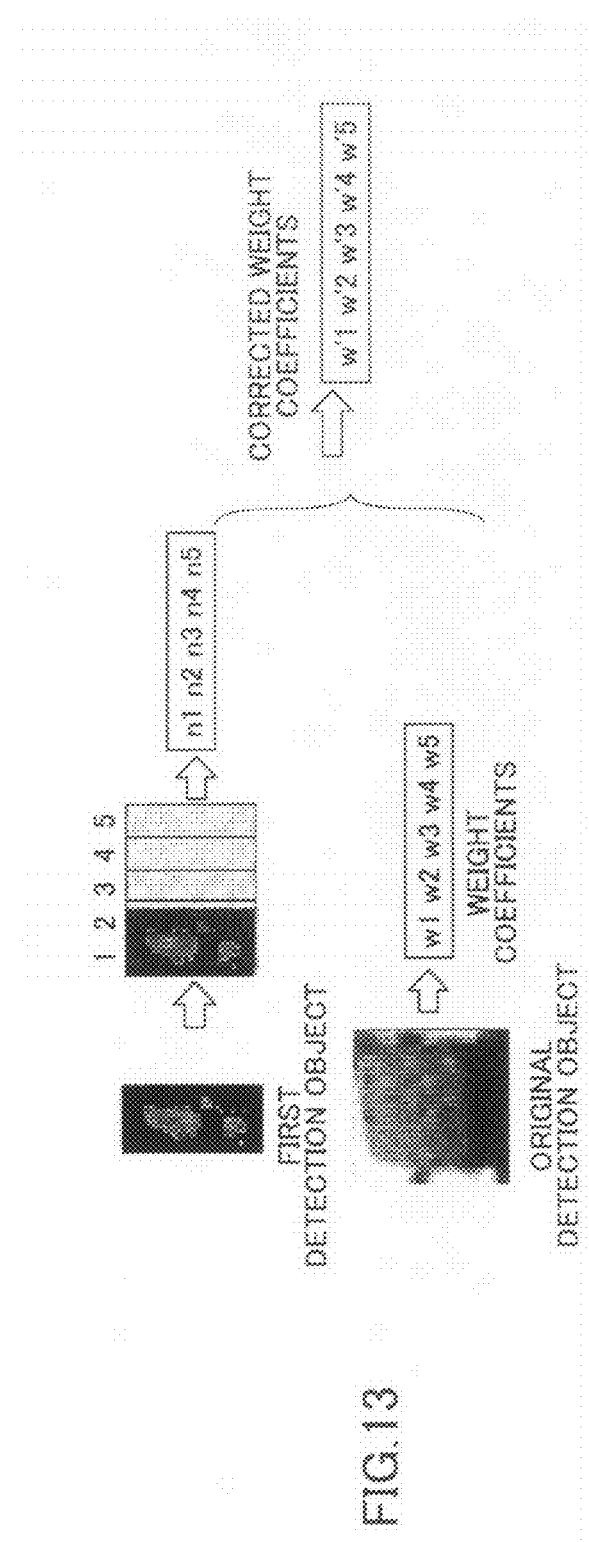
FIG. 13 illustrates a process of correcting plural weight coefficients for an original detection object on the basis of a first detection object.

FIG. 13 illustrates a process of correcting plural weight coefficients for an original detection object on the basis of a first detection object.

As shown in FIG. 13, according to the first detection object related to an N-th frame, it may be seen that the number of the disparity points in a first original segment 1 is largest, the number of the disparity points in a second original segment 2 is second largest, and the number of the disparity points in each of third to fifth original segments 3 to 5 is almost zero. As a result, it is possible to know that if it is assumed that the relationship of the weight coefficients for the five original segments is $w_1 = w_2 = w_3 = w_4 = w_5$ before correction, then after correction, the relationship becomes $w'_1 > w'_2 > w'_3 = w'_4 = w'_5$.

After correcting the weight coefficients for the original detection object in the original image of the N-th frame, it is possible to let the corrected ones serve as new weight coefficients which will be used for continuously detecting the original detection object in the original image of the (N+1)-th frame by utilizing STEP S220 of FIG. 6.

Here it is assumed that the original image of the (N+1)-th frame captured by the twin-lens camera is the grayscale image shown in FIG. 2B. By comparing the locally enlarged image on the right side of FIG. 2B and the locally enlarged image shown in FIG. 8B, it may be seen that compared to the N-th frame, in the (N+1)-th frame, the brightness of the right part of the vehicle far away from the twin-lens camera is obviously increased due to an environmental factor such as lighting.

As described above, in the case of FIGS. 2A and 2B, if the conventional original image based object detection method is adopted, then since no weight coefficient assignment process and correction process are conducted with respect to the original detection object in the original image of the N-th frame, the matching degree between the original detected object in the original image of the (N+1)-th frame and the original detection object in the original image of the N-th frame (here it is a historical object template with respect to the original image of the (N+1)-th frame) is less than the predetermined threshold T1. That is to say, the original detection object in the original image of the (N+1)-th frame may be incorrectly considered as a new object, thereby result in the object missing in the (N+1)-th frame.

On the contrary, by adopting the object detection method according to this embodiment, it is possible to, in the original image of the (N+1)-th frame, utilize the corrected weight coefficients in the original image of the N-th frame so as to be able to conduct more accurate object detection.

Figure 14:
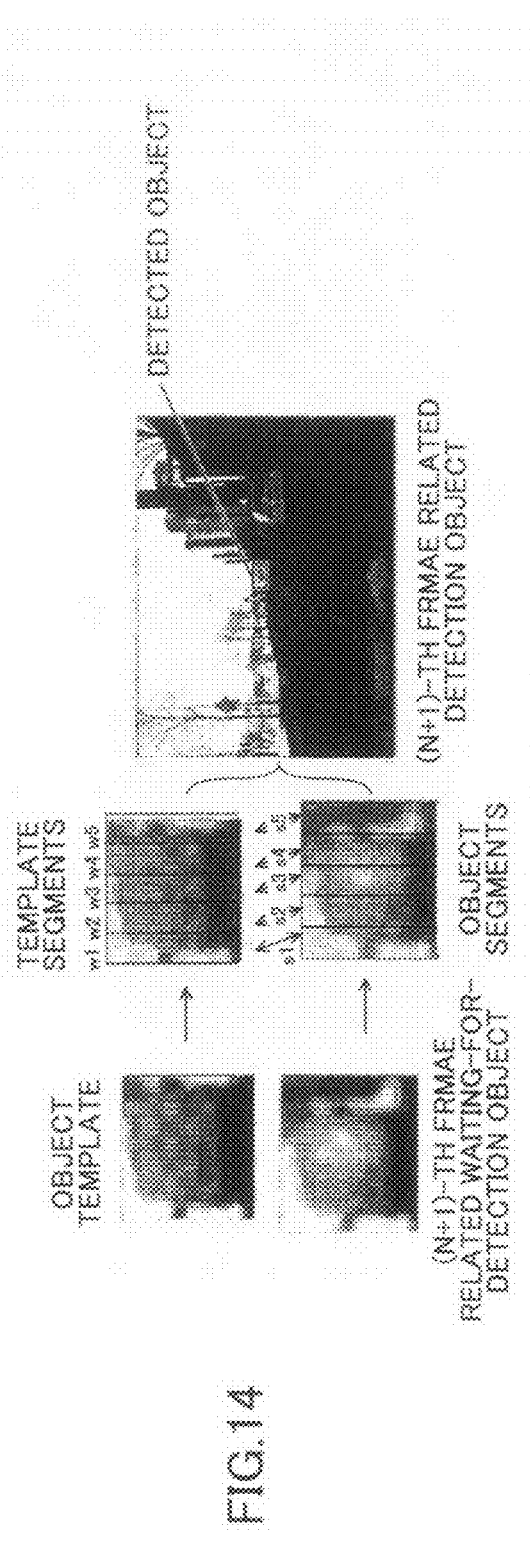
FIG. 14 illustrates a current detection object detected by the object detection method according to the embodiment of the present invention on the basis of an (N+1)-th frame.

FIG. 14 illustrates a current detection object detected by the object detection method according to this embodiment on the basis of the (N+1)-th original image.

As shown in FIG. 14, it is possible to utilize the corrected weight coefficients to conduct STEP S220 of FIG. 6 with respect to the original image of the (N+1)-th frame. Regarding the original image of the (N+1)-th frame, max(Object Similarity)=$\Sigma_{1\le i \le M} w'_i * S_i$ instead of max(Object Similarity)=$\Sigma_{1\le i \le M} w_i * S_i$; as a result, it is possible to obtain that $\Sigma w'_i * S_i > T1$, thereby it is possible to accurately detect the vehicle far away from the twin-lens camera in the original image of the (N+1)-th frame.

Therefore, it can be seen that in the object detection method according to this embodiment, by conducting the weight coefficient correction process, it is possible to increase the accuracy of the object detection process conducted with respect to the original image of the next frame.

In STEP S250 of FIG. 6, the first detection object is corrected on the basis of the original detection object so as to obtain a second detection object.

After obtaining the matched original detection object and first detection object, since it may be considered that the two have a same position and size, it is also possible to correct the first detection object in the disparity map of the current frame on the basis of the original detection object in the original image of the current frame, so as to output a more accurate disparity map based detection object.

Since the original image based object detection method may utilize a grayscale image based object template to detect an object, the grayscale image based detection object may have abundant grayscale information. That is to say, compared to the disparity map based detection object obtained by the disparity map based object detection method, the position and region of the grayscale image based detection object may be more accurate.

Figure 15:
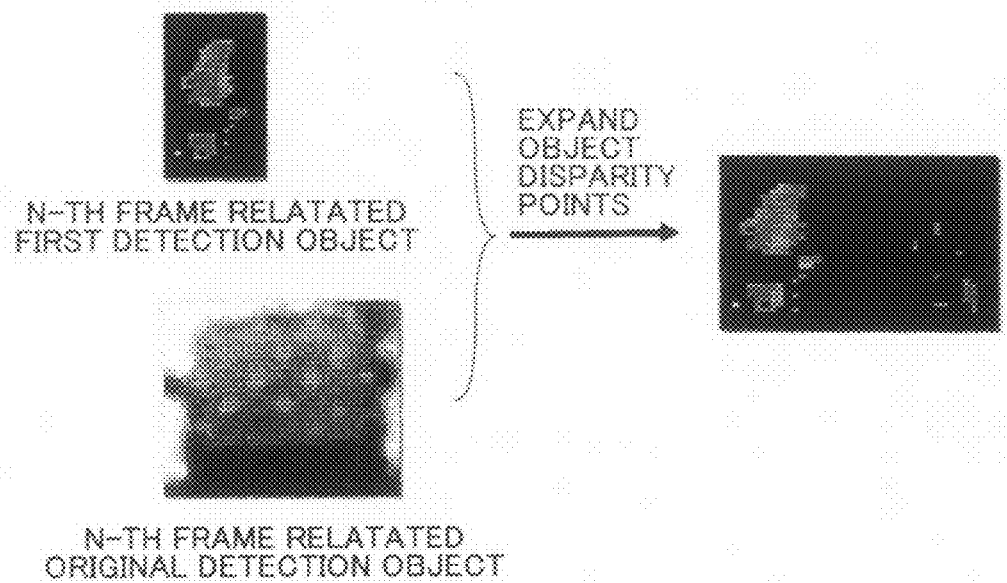
FIG. 15 illustrates a process of correcting a first detection object on the basis of an original detection object.

FIG. 15 illustrates a process of correcting a disparity map based detection object (i.e., a first detection object) on the basis of a grayscale image based detection object (i.e., an original detection object).

As shown in FIG. 15, it is possible to, on the basis of the position and region of the original detection object, adjust (expand or contract) the region of the first detection object so as to newly generate a second detection object whose position and region are the same as the position and region of the original detection object, so that it is possible to output a more accurate result of the disparity map based detection object.

In addition, each disparity point included in the region of the original detection object may represent the distance to the twin-lens camera. However, the distance between the first detection object (e.g., the vehicle far away from the twin-lens camera) and the twin-lens camera may be within a predetermined range. As a result, in an example, it is possible to add only disparity points, which are in the region of the original detection object and from which the distances to the first detection object are within a distance range, into the disparity point set forming the first detection object. Here it should be noted that the distance range may be predetermined on the basis of the distance between a vehicle and a twin-lens camera in a corresponding scenario, or may be artificially preset to a fixed value.

In this way, it is possible to obtain a more accurate disparity map based detection object in the disparity map of the N-th frame, i.e., a corrected disparity point set of the object. As a result, it is possible to use the corrected disparity point set of the object to conduct STEP S210 of FIG. 6 with respect to the original image of the (N+1)-th frame. In other words, it is possible to use the corrected disparity point set of the object to determine the position of the historical detection object in the original image of the N frame, and then to determine the new moving velocity and direction of the waiting-for-detection object on the basis of the positions of the historical detection object in the (N−1)-th and N-th frames and the time interval between the two frames, so that it is possible to let the object position prediction with respect to the (N+1)-th frame be more accurate.

Therefore, it can be seen that by utilizing the object detection method according to this embodiment, it is possible to use the interaction relationship between the original image based objection method and the disparity map based objection method to more accurately detect an object. That is to say, it is possible to use the disparity distribution of a waiting-for-detection object and its corresponding grayscale image to determine the stable part and features of the waiting-for-detection object on the disparity dimension; to adjust the segments of a grayscale image based object template on the basis of the stable part and features; to find a noise segment or missing segment in the corresponding disparity map on the basis of a grayscale image based detection object; and to expand or contract a disparity map based detection object. In addition, it is also possible to let the detected object become more and more accurate by repeatedly conducting the above processes. As a result, according to this embodiment, the original image based object detection method may become more robust to the environmental change, and at the same time, the disparity map based object detection method may become more accurate even in a case of a spare disparity map.

Here it should be noted that although the object detection method has been described according to the specific order as described above, the present invention is not limited to this. For example, in FIG. 6, STEP S220 may be conducted before STEP S210 if it is not necessary to obtain the object ROI, and STEP S250 may also be conducted before STEP S240.

4. Object Detection Device

In what follows, an object detection device according to an embodiment of the present invention will be described by referring to FIG. 16.

Figure 16:
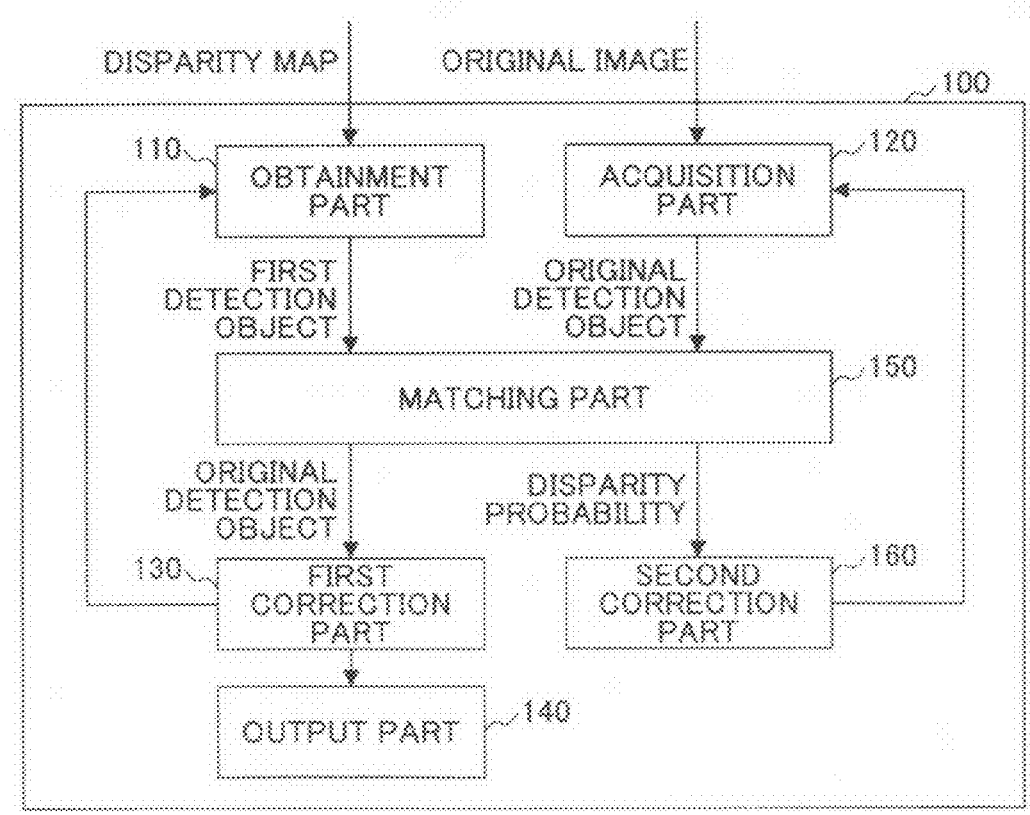
FIG. 16 is a block diagram of an object detection device according to an embodiment of the present invention.

FIG. 16 is a block diagram of an object detection device 100 according to an embodiment of the present invention.

The object detection device 100 may be used to detect an object on the basis of an image pair corresponding to a current frame. The image pair includes an original image of the current frame and a disparity map of the same current frame. The original image of the current frame includes at least one of a grayscale image and a color image of the current frame. As shown in FIG. 16, the object detection device 100 may include an obtainment part 110, an acquisition part 120, a first correction part 130, and an output part 140.

In addition, the object detection device 100 may further include a matching part 150 and/or a second correction part 160.

The obtainment part 110 may be configured to obtain a first disparity map based detection object (also called a "first detection object") detected in the disparity map of the current frame.

The acquisition part 120 may be configured to acquire an original image based detection object (also called an "original detection object") detected in the original image of the current frame.

The first correction part 130 may be configured to correct the first detection object on the basis of the original detection object so as to obtain a second disparity map based detection object (also called a "second detection object").

The output part 140 may be configured to output the second detection object.

In an example, the obtainment part 100 may obtain the first detection object by conducting the following steps, namely, obtaining a historical detection object from the disparity map of a historical frame; estimating, on the basis of the historical detection object, a current estimation object corresponding to the historical detection object in the disparity map of the current frame; determining one or more disparity map based candidate objects (also called "first candidate objects") in the disparity map of the current frame; determining the matching degree between the current estimation object and each of the first candidate objects; and determining a first candidate object, whose relevant matching degree is maximum, as the first detection object.

In an example, the acquisition part 120 may acquire the original detection object by conducting a step of acquiring an original image based detection object detected in a predetermined range of the current estimation object in the original image of the current frame, so as to serve as the original detection object.

In an example, the acquisition part 120 may acquire the original detection object by conducting the following steps, namely, obtaining a historical object template and plural historical weight coefficients for the historical object template, the historical object template being divided into plural historical segments which are respectively assigned the plural historical weight coefficients; determining, on the basis of the historical object template, one or more original image based candidate objects (also called "original candidate objects") in the original image of the current frame; calculating, on the basis of the plural historical segments and the plural historical weight coefficients, the weighted similarity between the historical object template and each of the original candidate objects; and determining an original candidate object, whose relevant weighted similarity is maximum, as the original detection object.

In particular, the acquisition part 120 may calculate, on the basis of the plural historical segments and the historical plural weight coefficients, the weighted similarity between the historical object template and each of the original candidate objects by conducting the following steps, namely, regarding each of the original candidate objects, dividing this original candidate object into plural original segments in the same way as the historical object template is divided into the plural historical segments; calculating the segment similarities between the plural original segments and the plural historical segments, respectively; weighting the segment similarities by using the plural historical weight coefficients, respectively; and calculating the sum of the weighted segment similarities to serve as the weighted similarity between this original candidate object and the historical object template.

In an example, the matching part 150 may be configured to determine, before correcting the first detection object on the basis of the original detection so as to obtain the second detection object, whether the first detection object and the original detection object match each other.

In particular, the matching part 150 may determine whether the first detection object and the original detection object match each other by conducting the following steps, namely, determining whether the overlap area between the first detection object and the original detection object is greater than or equal to a predetermined threshold, and if so, then determining that the two match each other; and determining whether the distance between the first detection object and the original detection object is less than or equal to a predetermined threshold, and if so, then determining that the two match each other.

In an example, the second correction part 160 may be configured to adjust the plural historical weight coefficients on the basis of the first detection object so as to obtain plural current weight coefficients which will be considered as plural historical weight coefficients with respect to the next frame.

In particular, the second correction part 160 may adjust the plural historical weight coefficients on the basis of the first detection object so as to obtain the plural current weight coefficients by conducting the following steps, namely, determining the disparity point distributions of the first detection object in the original segments, respectively; and adjusting the plural historical weight coefficients on the basis of the determined disparity point distributions so as to obtain the plural current weight coefficients, respectively.

In an example, the first correction part 130 may correct the first detection object on the basis of the original detection object so as to obtain the second detection object by conducting the following steps, namely, determining a current correction region in the disparity map of the current frame on the basis of the original detection object; and generating the second detection object on the basis of at least a set of disparity points included in the current correction region.

Here it should be noted that since the operations and functions of the obtainment part 110, the acquisition part 120, the first correction part 130, the output part 140, the matching part 150, and the second correction part 160 have been described in detail by referring to FIGS. 1 to 15, their descriptions are omitted here.

5. Object Detection System

In what follows, an object detection system according to an embodiment of the present invention will be described by referring to FIG. 17.

FIG. 17 is a block diagram of an object detection system 200 according to an embodiment of the present invention.

As shown in FIG. 17, the object detection system 200 may include an imaging device 210 and an object detection device 220.

The imaging device 210 may be configured to capture the images of an object so as to obtain an image sequence. For example, it may be a signal-lens camera, a twin-lens camera, or a multi-lens camera.

The object detection device 220 may be configured to detect the object on the basis of an image pair corresponding to a current frame in the image sequence. For example, it may be the object detection device 100 shown in FIG. 16.

In particular, first a grayscale or color image and a corresponding disparity map, which are obtained by a twin-lens camera mounted in a specific position (e.g., a vehicle), are input into the object detection device 220. After that, the object detection device 220 conducts the object detection as described above, and then outputs the object detection result which may be, for example, a grayscale image or a disparity map, and may be displayed on, for example, a display.

6. Hardware System for Object Detection

In what follows, a hardware system for conducting object detection according to an embodiment of the present invention will be described by referring to FIG. 18.

FIG. 18 is a block diagram of a hardware system 300 for conducting object detection, according to an embodiment of the present invention.

As shown in FIG. 18, the hardware system 300 may include an input device 310, a processing device 320, an output device 330, and a storage device 340, and may be, for example, a general-purpose computer.

The input device 310 may be configured to input the relevant information such as a grayscale image, a color image, a disparity map, and the setting information of a camera. For example, it may include a keyboard, a mouse, a communications network, a remote input device connected to the communications network, etc. And it may also include an imaging device for capturing and forming the images of an object, a decoder for decoding the formed images, etc.

The processing device 320 may be configured to implement the object detection method according to the embodiment of the present invention, or to serve as the object detection device according to the embodiment of the present invention. For example, it may include a central processing unit of a computer, a chip having processing ability, etc., and may be connected to a network such as the Internet (not shown in the drawings) for carrying out remote data transmission.

The output device 330 may be configured to output the results obtained by utilizing the object detection method and device according to the embodiments of the present invention. For example, it may include a display, a printer, a communications network, a remote output device connected to the communications network, etc.

The storage device 340 may be configured to store the relevant data when utilizing the object detection method and device according to the embodiments of the present invention. For example, it may include a volatile or non-volatile memory such as a read-only memory (ROM), a random access memory (RAM), a hard disk, or a semiconductor memory.

Figure 19:
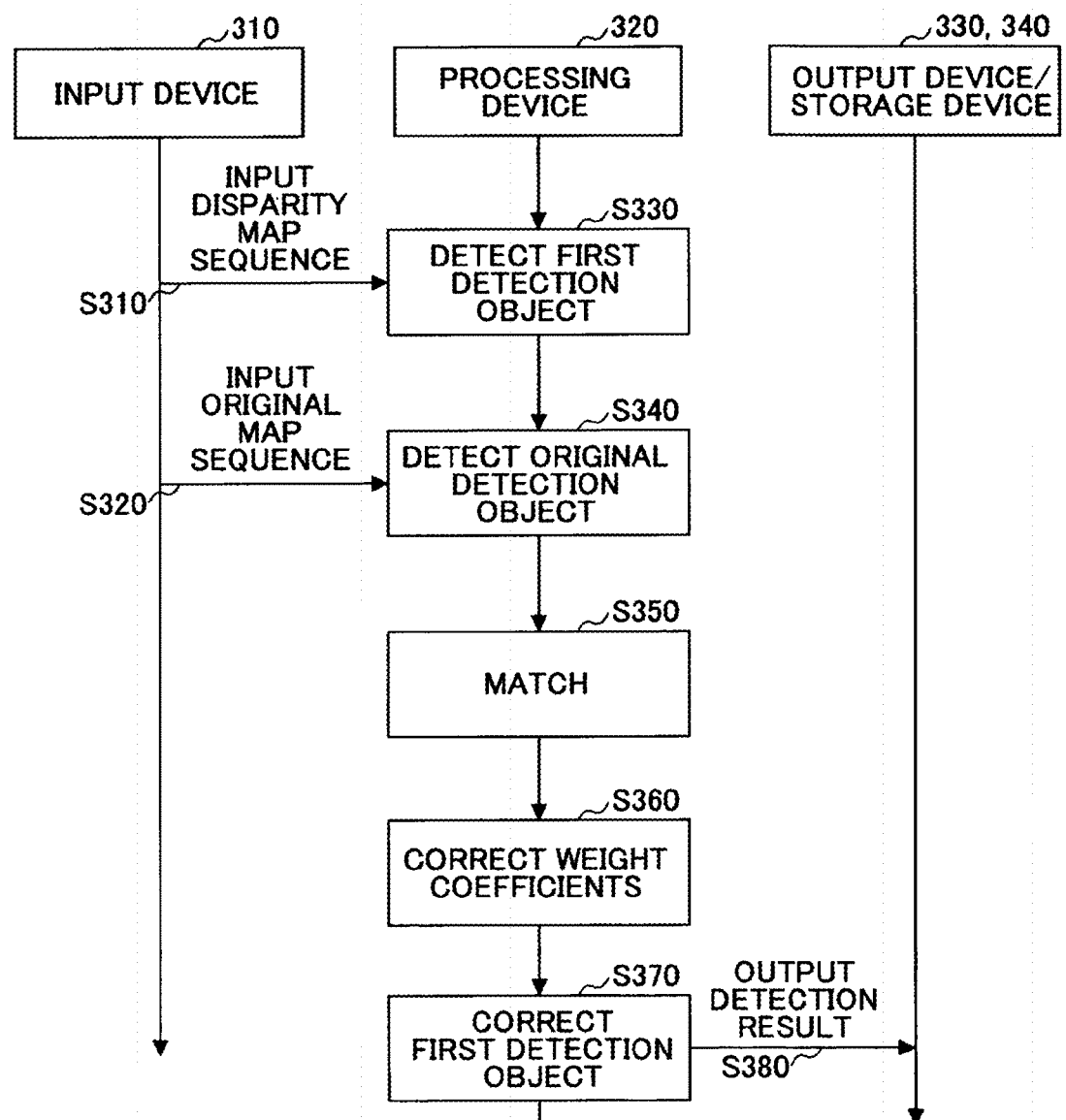
FIG. 19 illustrates a process sequence of a hardware system for conducting object detection, according to an embodiment of the present invention.

FIG. 19 illustrates a process sequence of the hardware system 300 for conducting the object detection, according to an embodiment of the present invention.

As shown in FIG. 19, the input device 310 inputs a disparity image sequence (STEP S310) and a grayscale image sequence (STEP S320). In the processing device 320, it is possible to detect, on the basis of a disparity map, an object so as to output a disparity map based detection object (i.e., a first detection object) (S330); to detect, on the basis of a grayscale image, an object so as to output a grayscale image based detection object (i.e., an original detection object) (S340); to conduct matching with respect to the disparity map based detection object and the grayscale image based detection object (S350); to correct plural detection parameters (i.e., plural weight coefficients) for a grayscale image based object template (S360); to correct the disparity map based detection object (i.e., the first detection object) on the basis of the grayscale image based detection object (S370); and to output the detected result to the output device 330 or the storage device 340 (S380).

Here it should be noted that the above respective embodiments are just exemplary ones, and the specific structure and operation of each of them may not be used for limiting the present invention.

Moreover, the embodiments of the present invention may be implemented in any convenient form, for example, using dedicated hardware or a mixture of dedicated hardware and software. The embodiments of the present invention may be implemented as computer software implemented by one or more networked processing apparatuses. The network may comprise any conventional terrestrial or wireless communications network, such as the Internet. The processing apparatuses may comprise any suitably programmed apparatuses such as a general-purpose computer, personal digital assistant, mobile telephone (such as a WAP or 3G-compliant phone) and so on. Since the embodiments of the present invention can be implemented as software, each and every aspect of the present invention thus encompasses computer software implementable on a programmable device.

The computer software may be provided to the programmable device using any storage medium for storing processor-readable code such as a floppy disk, a hard disk, a CD ROM, a magnetic tape device or a solid state memory device.

The hardware platform includes any desired hardware resources including, for example, a central processing unit (CPU), a random access memory (RAM), and a hard disk drive (HDD). The CPU may include processors of any desired type and number. The RAM may include any desired volatile or nonvolatile memory. The HDD may include any desired nonvolatile memory capable of storing a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

While the present invention is described with reference to the specific embodiments chosen for purpose of illustration, it should be apparent that the present invention is not limited to these embodiments, but numerous modifications could be made thereto by those people skilled in the art without departing from the basic concept and technical scope of the present invention.

The present application is based on and claims the benefit of priority of Chinese Patent Application No. 201410341591.9 filed on Jul. 17, 2014, the entire contents of which are hereby incorporated by reference.

What is claimed is:

1. An object detection method used to detect an object in an image pair corresponding to a current frame, the image pair including an original image of the current frame and a disparity map of the same current frame, the original image of the current frame including at least one of a grayscale image and a color image of the current frame, the object detection method comprising:

obtaining a first detection object detected in the disparity map of the current frame;

acquiring an original detection object detected in the original image of the current frame;

correcting first, based on the original detection object, the first detection object so as to obtain a second detection object;

outputting the second detection object obtaining a historical object template and plural historical weight coefficients for the historical object template, the historical object template being divided into plural historical segments which are respectively assigned the plural historical weight coefficients;

determining, based on the historical object template, one or more original candidate objects in the original image of the current frame;

respectively calculating, based on the plural historical segments and the plural historical weight coefficients, weighted similarities between the historical object template and the one or more original candidate objects; and determining an original candidate object, whose relevant weighted similarity is maximum, as the original detection object.

2. The object detection method according to claim 1, wherein, the respectively calculating, based on the plural historical segments and the plural historical weight coefficients, the weighted similarities between the historical object template and the one or more original candidate objects includes:

regarding each of the one or more original candidate objects, dividing the corresponding original candidate object into plural original segments in a same way as the historical object template is divided into the plural historical segments;

respectively calculating plural segment similarities between the plural original segments and the plural historical segments;

respectively weighting the plural segment similarities by using the plural historical weight coefficients; and calculating a sum of the plural weighted segment similarities so as to serve as the weighted similarity between the corresponding original candidate object and the historical object template.

3. The object detection method according to claim 1, further comprising:

correcting second, based on the first detection object, the plural historical weight coefficients so as to obtain plural current weight coefficients which will serve as historical weight coefficients with respect to an original image of a next frame.

4. The object detection method according to claim 3, wherein, the correcting second includes:

respectively determining plural disparity point distributions of the first detection object in plural original segments obtained by dividing the original detection object in a same way as the historical object template is divided into the plural historical segments; and respectively generating, based on the plural disparity point distributions, the plural current weight coefficients for the plural original segments of the original detection object.

5. An object detection method used to detect an object in an image pair corresponding to a current frame, the image pair including an original image of the current frame and a disparity map of the same current frame, the original image of the current frame including at least one of a grayscale image and a color image of the current frame, the object detection method comprising:

obtaining a first detection object detected in the disparity map of the current frame;

acquiring an original detection object detected in the original image of the current frame;

correcting, based on the original detection object, the first detection object so as to obtain a second detection object;

outputting the second detection object;

obtaining a historical detection object in a disparity map of a historical frame;

based on the historical detection object, estimating, in the disparity map of the current frame, a current estimation object corresponding to the historical detection object;

determining one or more first candidate objects in the disparity map of the current frame;

respectively determining matching degrees between the current estimation object and the one or more first candidate objects; and determining a first candidate object, whose relevant matching degree is maximum, as the first detection object.

6. The object detection method according to claim 5, wherein, the acquiring includes:

acquiring the original detection object detected in a predetermined range of the current estimation object in the original image of the current frame.

7. The object detection method according to claim 1, wherein, the correcting first includes:

determining, based on the original detection object, a current correction region in the disparity map of the current frame; and generating the second detection object based on at least a set of disparity points included in the current correction region.

8. The object detection method according to claim 1, before the correcting first, further comprising:

a determination step of determining whether the first detection object and the original detection object match each other.

9. The object detection method according to claim 8, wherein, the determining whether the first detection object and the original detection object match each other includes at least one of steps of:

determining whether an overlap area between the first detection object and the original detection object is greater than or equal to a predetermined threshold, and if so, then determining that the first detection object and the original detection object match each other; and determining whether a distance between the first detection object and the original detection object is less than or equal to a predetermined threshold, and if so, then determining that the first detection object and the original detection object match each other.

10. An object detection device used to detect an object in an image pair corresponding to a current frame, the image pair including an original image of the current frame and a disparity map of the same current frame, the original image of the current frame including at least one of a grayscale image and a color image of the current frame, the object detection device comprising:

a memory including computer readable instructions; and one or more processors configured to execute the computer readable instructions to perform obtaining a first detection object detected in the disparity map of the current frame;

acquiring an original detection object detected in the original image of the current frame;

correcting first, based on the original detection object, the first detection object so as to obtain a second detection object;

outputting the second detection object;

obtaining a historical object template and plural historical weight coefficients for the historical object template, the historical object template being divided into plural historical segments which are respectively assigned the plural historical weight coefficients;

determining, based on the historical object template, one or more original candidate objects in the original image of the current frame;

respectively calculating, based on the plural historical segments and the plural historical weight coefficients, weighted similarities between the historical object template and the one or more original candidate objects; and determining an original candidate object, whose relevant weighted similarity is maximum, as the original detection object.

11. The object detection device according to claim 10, wherein the one or more processors are further configured to perform dividing the corresponding original candidate object into plural original segments in a same way as the historical object template is divided into the plural historical segments;

respectively calculating plural segment similarities between the plural original segments and the plural historical segments;

respectively weighting the plural segment similarities by using the plural historical weight coefficients; and calculating a sum of the plural weighted segment similarities so as to serve as the weighted similarity between the corresponding original candidate object and the historical object template.

12. The object detection device according to claim 10, wherein the one or more processors are further configured to perform correcting second, based on the first detection object, the plural historical weight coefficients so as to obtain plural current weight coefficients which will serve as historical weight coefficients with respect to an original image of a next frame.

13. The objet detection device according to claim 12, wherein the correcting second includes:

respectively determining plural disparity point distributions of the first detection object in plural original segments obtained by dividing the original detection object in a same way as the historical object template is divided into the plural historical segments; and respectively generating, based on the plural disparity point distributions, the plural current weight coefficients for the plural original segments of the original detection object.

* * * * *